Aug. 8, 1939.    A. J. EVERS    2,168,401
APPARATUS FOR SEPARATING BLANKS FROM SHEET MATERIAL
Filed Nov. 18, 1937    4 Sheets-Sheet 4
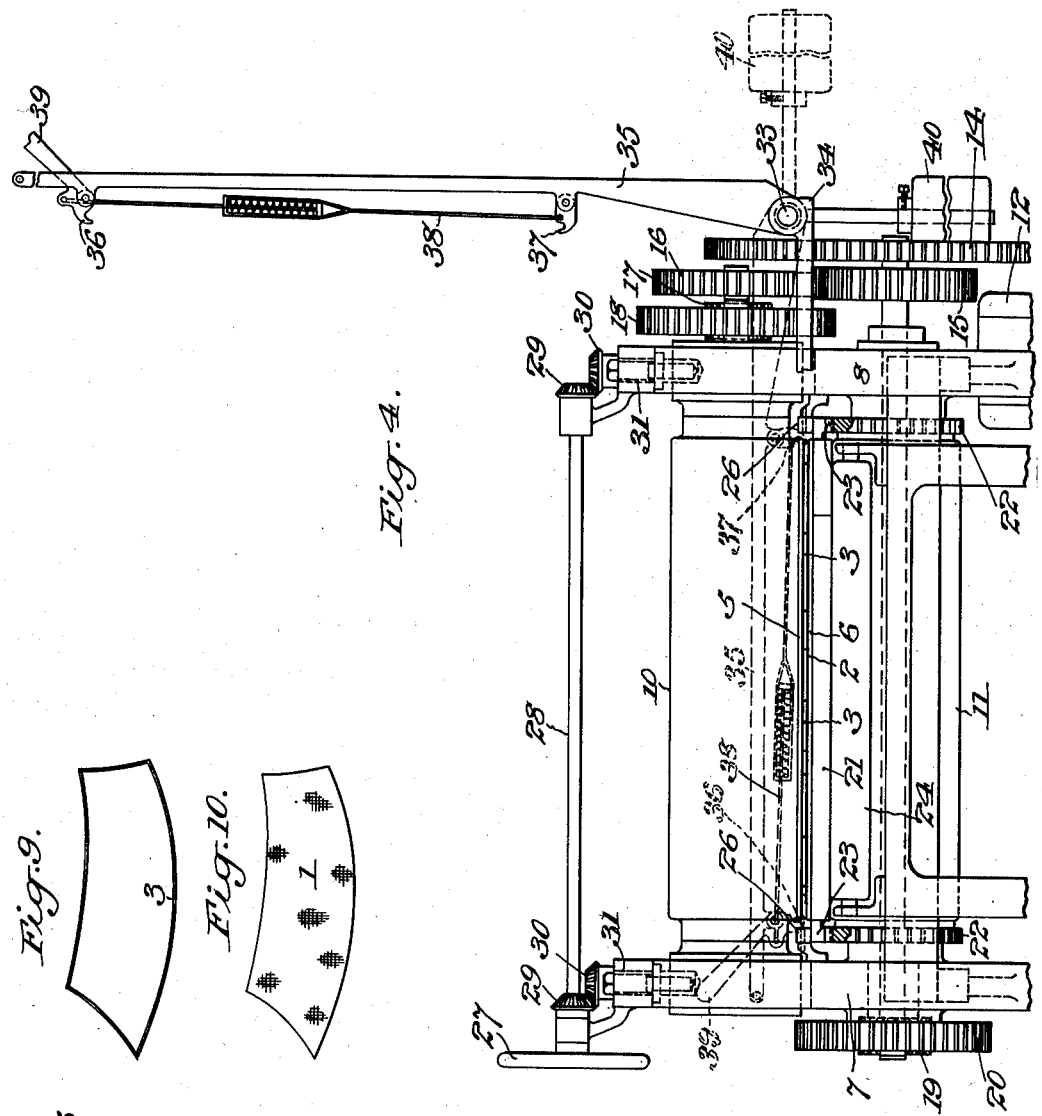
INVENTOR
BY
ATTORNEYS Patented Aug. 8, 1939

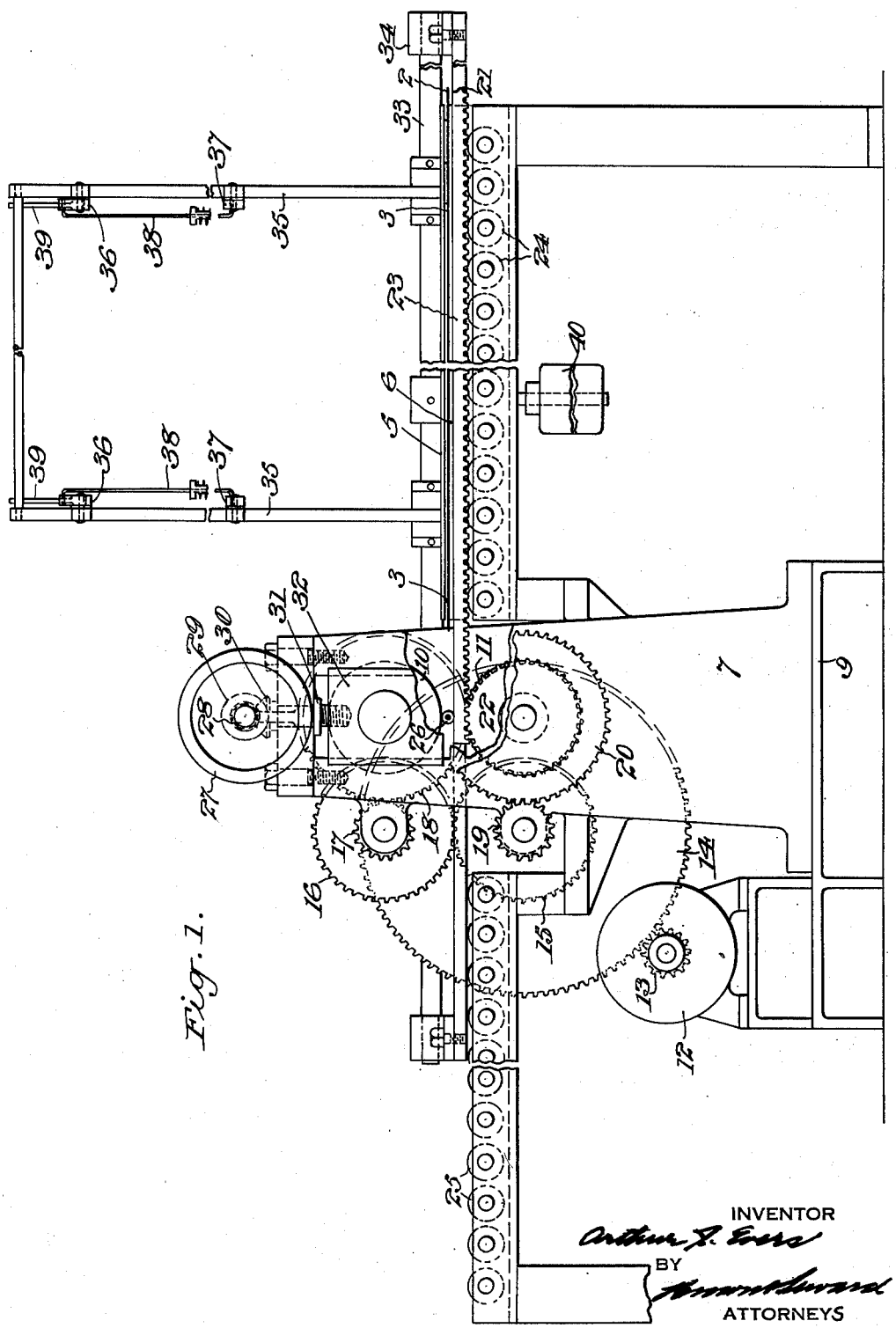

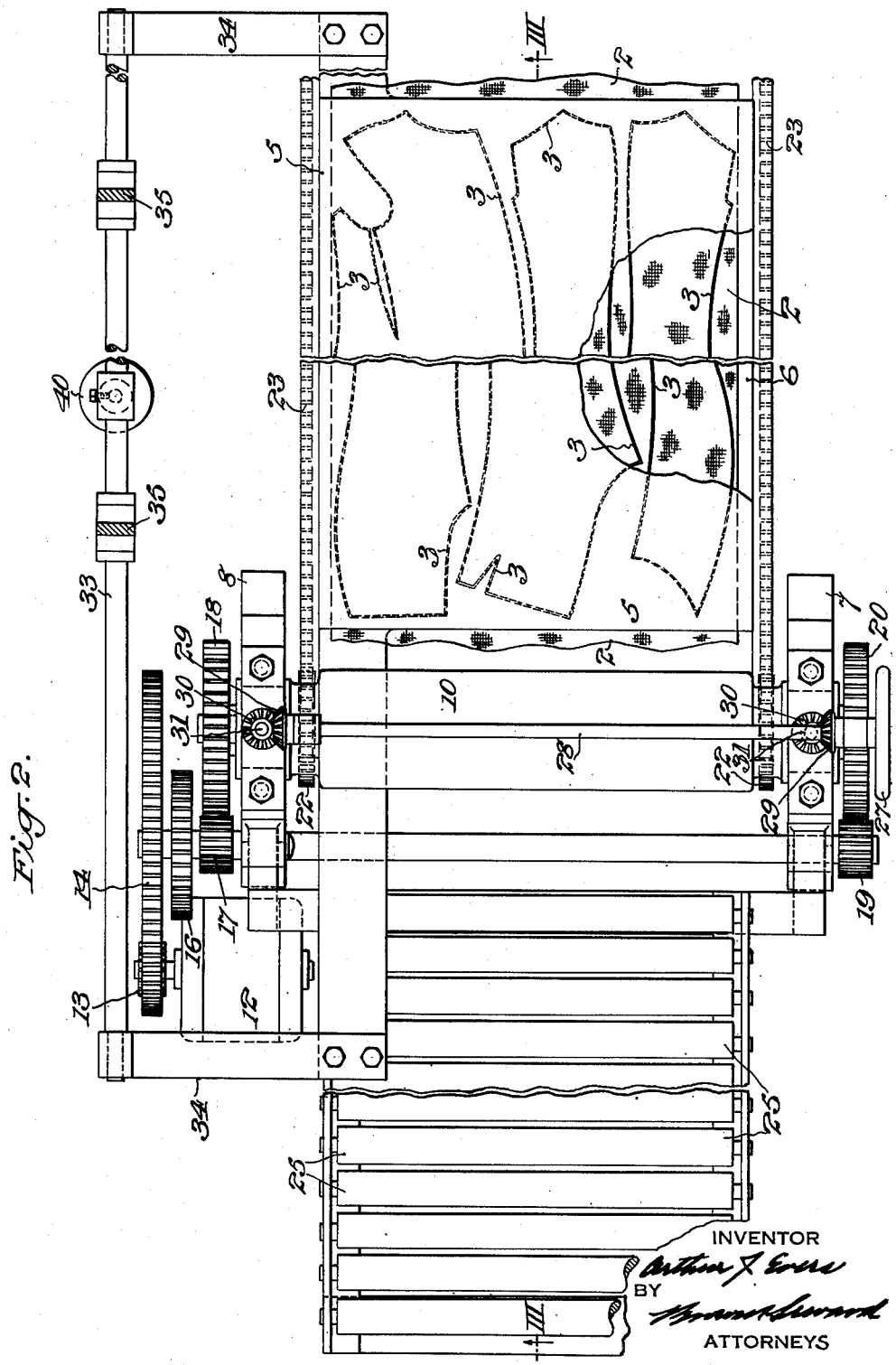

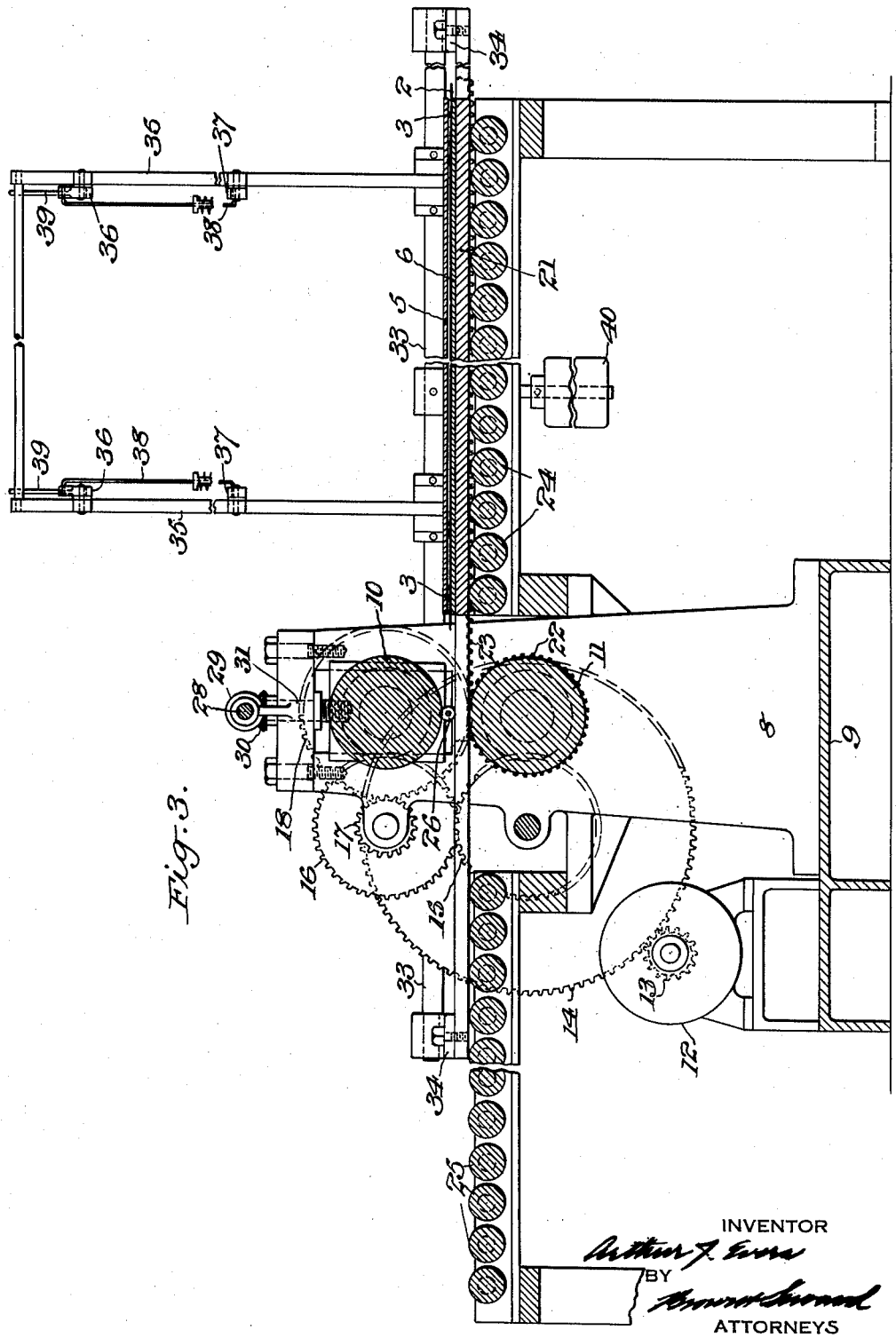

2,168,401

UNITED STATES PATENT OFFICE 2,168,401

APPARATUS FOR SEPARATING BLANKS FROM SHEET MATERIAL

Arthur J. Evers, Westerly, R. I., assignor to C. B. Cottrell & Sons Company, Westerly, R. I., a corporation of Delaware Application November 18, 1937, Serial No. 175,288

11 Claims. (Cl. 164—19)

The object of my invention is to provide a simple, efficient, and inexpensive means whereby blanks of predetermined contours may be separated, by pressure, from sheet material.

The object of my invention, more specifically, is to provide a novel apparatus for separating by pressure, in a single operation, garment blanks from a sheet of fabric whereby the blanks for a complete garment or suit may be separated from the sheet of garment fabric at a single operation.

My invention comprises the provision of removable skeleton frames, shaped to predetermined contours, said shaped frames having dull operating surfaces and being positioned with the sheet material between elements having suitable pressure surfaces, means being employed for exerting pressure on said elements for causing the separation of the blanks from their sheet material by said shaped frames.

A practical embodiment of my invention is represented in the accompanying drawings, in which Fig. 1 represents the apparatus in side elevation with the movable parts in the positions they assume when the reciprocating bed is about to start on its forward movement through the pressure rolls, the lifting bracket for handling the upper pressure plate being shown in its raised position;

Fig. 2 represents a top plan view of the apparatus;

Fig. 3 represents a longitudinal vertical section taken in the plane of the line III—III of Fig. 2, looking in the direction of the arrows;

Fig. 4 represents an end view of the apparatus, the lifting bracket being shown in full lines in its raised position, and in dotted lines in its lowered position;

Fig. 5 represents an enlarged detail section showing the upper and lower pressure plates with the interposed sheet material and shaped wire before pressure has been applied thereto;

Fig. 6 represents a similar section after the pressure has been applied to cause the shaped wire to separate the blank from the sheet material;

Figs. 7 and 8 represent detail cross sections through other forms of wire; and

Figs. 9 and 10 represent plan views of one of the shaped wires and the blank which was separated thereby from the sheet material.

The sheet material from which the blanks I are separated is denoted by 2. The skeleton frame for separating the blanks from the sheet material is herein shown as a wire 3 bent to the predetermined contour, the ends of the wire being preferably permanently united, as by welding. The shaped wire has a dull sheet material engaging surface 4 and the wire may be of any desired cross sectional form. For instance, in Figs. 5 and 6, I have shown a wire as elongated in cross section with concave top and bottom edges. In Fig. 7, I have shown a wire round in cross section, and in Fig. 8 I have shown a wire having a flat upper surface and a convex lower or sheet material engaging surface.

Two elements, in the present instance, upper and lower pressure plates 5 and 6 have plane surfaces which are arranged to receive between them the shaped wire 3 and the sheet material 2.

Suitable means may be provided for exerting pressure on the upper and lower plates 5 and 6 sufficient to cause the shaped wire to separate the blank I from its sheet material 2. The means herein shown comprises an apparatus which is constructed, arranged and operated as follows:

The sides 7 and 8 of the frame uprise from a suitable base 9. The upper and lower pressure rolls 10 and 11 are rotatably mounted in sliding and fixed bearings respectively, in the side frames 7 and 8. The upper pressure roll 10 may be positively driven from a reversing motor 12 mounted on the base 9 of the frame, through a train of gears 13, 14, 15, 16, 17, 18. The lower pressure roll 11 may be positively driven from the shaft of the gear 15 through gears 19, 20.

The reciprocating bed is denoted by 21 and it may be positively driven from the shaft of the lower pressure roll 11 at the opposite sides of the frame through gears 22, 22 on the shaft of the pressure roll 11 and racks 23, 23 carried by the bed 21. This bed may be supported on the usual banks of rollers 24, 25 located at the front and rear of the pressure rolls 10 and 11. Hold-down rollers 26, 26 may be provided for the reciprocating bed.

The upper pressure roll 10 may be adjusted toward and away from the lower pressure roll 11, as, for instance, by a hand wheel 27 carried by a cross shaft 28 which has beveled gear connections 29, 30 with vertical shafts 31, 31 provided with screw threaded portions engaging the sliding bearings 32, 32 of the upper pressure roll 10.

The means which I have shown for raising and lowering the removable upper pressure plate 5 is as follows:

A longitudinally disposed rock shaft 33 is mounted in a frame 34 carried by the reciprocating bed 21, which rock shaft is located outside the side frame 8 and beyond the gearing so that it will not interfere with the same in the reciprocation of the bed.

A pair of uprising arms 35, 35 of a swinging bracket is fixed to this rock shaft 33, each of which arms carries a pair of manually operated hooks 36, 37, yieldingly connected by a divided rod 38. An operating handle 39 is carried by the hook 36 for bringing the hook into and out of engagement with the side edges of the removable upper pressure plate when the bracket is swung down across the bed.

A counterweight 40 may be provided on the rock shaft 33 for counterbalancing the weight of the upper pressure plate 5 when it is engaged and held by the plate lifting bracket.

In operation: Let it be assumed that a plurality of separate wires have been bent to predetermined contours. The sheet of material, fabric, if blanks for clothing are to be produced, is placed on the lower pressure plate 6, which may, if so desired, form a part of the reciprocating bed. The shaped wires are then placed in the desired arrangement upon the sheet of material. The upper pressure plate 5 which has been carried by the swinging bracket is then lowered onto the shaped wires and sheet material. The hooks 36 and 37 of the swinging bracket are then operated to release the bracket from the upper pressure plate. The bracket is then swung to its raised position. The bed may then be advanced to pass the pressure plates and interposed sheet material and shaped wires through the pressure rolls 10 and 11, thereby causing the shaped wires to separate the blanks from the sheet material by pressure and at a single operation.

When the bed reaches the end of its forward movement the swinging bracket may be lowered and its hooks caused to engage the side edges of the upper pressure plate. The said plate is then removed by swinging the bracket to its raised position. The shaped wires, the blanks and the blanked-out sheet material may then be removed from the lower plate. The bed with the lower plate and the raised bracket with the upper plate may then be returned to their original positions, ready for the next operation.

From the above description it will be seen that I have provided a simple, inexpensive and efficient means for blanking out sheet material and that I am enabled by said means to separate, by pressure, in a single operation, the blanks necessary to produce a garment or suit from a sheet of clothing fabric.

It will also be seen that by using shaped wires with dull sheet material engaging surfaces no sharpening of the surfaces is required as in the case where hardened dies with sharp cutting edges are provided for cutting the blanks from the sheet material.

It is evident that various changes may be resorted to in the construction, form and arrangement of the several parts without departing from the spirit and scope of my invention, and hence I do not intend to be limited to the particular embodiment herein shown and described, but what I claim is:

1. In combination, pressure means, unconnected upper and lower pressure plates adapted to receive sheet material between them, a shaped frame adapted to be removably positioned between the sheet material and one of the plates, and means for passing the pressure plates with the sheet material and frame through the pressure means to cause the frame to separate a blank from the sheet material, said upper pressure plate being removable to permit the removal of the shaped frame, the blank and the blanked-out sheet material.

2. In an apparatus for separating by pressure, a blank from sheet material, a pressure roll, unconnected upper and lower pressure plates adapted to receive sheet material between them, a shaped frame adapted to be removably positioned between said sheet material and one of said plates, and means for passing the pressure plates with the sheet material and frame forwardly under the pressure roll, the upper pressure plate being removable to permit the removal of the shaped frame, the blank, and the blanked-out sheet material.

3. In an apparatus for separating by pressure, a blank from sheet material, a pressure roll, upper and lower pressure plates adapted to receive sheet material between them, a shaped frame adapted to be removably positioned between said sheet material and one of said plates, means for passing the pressure plates with the sheet material and frame forwardly under the pressure roll, and means for removing the upper pressure plate at the end of its forward movement and replacing it at the end of its rearward movement.

4. In an apparatus for separating by pressure at a single operation a plurality of blanks from sheet material, a pressure roll, unconnected upper and lower pressure plates adapted to receive sheet material between them, a plurality of separate shaped frames adapted to be removably positioned between the sheet material and one of the plates, and means for passing the pressure plates with the interposed sheet material and frames forwardly under the pressure roll, said upper pressure plate being removable to permit the removal of the shaped frames, the blanks and the blanked-out sheet material.

5. In an apparatus for separating by pressure at a single operation a plurality of blanks from sheet material, a pressure roll, upper and lower pressure plates adapted to receive sheet material between them, a plurality of separate shaped frames adapted to be removably positioned between the sheet material and one of the plates, means for passing the pressure plates with the interposed sheet material and frames forwardly under the pressure roll, and means for removing the upper pressure plate at the end of its forward movement and replacing it at the end of its rearward movement.

6. In an apparatus for separating by pressure, a blank from sheet material, a pressure roll, upper and lower pressure plates adapted to receive sheet material between them, a shaped frame adapted to be removably positioned between said sheet material and one of the plates, a reciprocating support for passing the pressure plates with their interposed sheet material and frame forwardly under the pressure roll, and means on the reciprocating support for raising the upper plate out of its operative position at the end of its forward movement and lowering it into its operative position at the end of its rearward movement.

7. In an apparatus for separating by pressure, a blank from sheet material, a pressure roll, upper and lower pressure plates adapted to receive sheet material between them, a shaped frame adapted to be removably positioned between said sheet material and one of the plates, a reciprocating support for passing the pressure plates with their interposed sheet material and frame forwardly under the pressure roll, and a swinging bracket on the reciprocating support for raising the upper plate out of its operative position at the end of its forward movement and lowering it into its operative position at the end of its rearward movement.

8. In an apparatus for separating by pressure, a plurality of blanks from sheet material, a pressure roll, upper and lower pressure plates adapted to receive sheet material between them, a plurality of shaped frames adapted to be removably positioned between said sheet material and one of said plates, a reciprocating support for passing the pressure plates with their interposed sheet material and frames forwardly under the pressure roll, and means on the reciprocating support for raising the upper plate out of its operative position at the end of its forward movement and lowering it into its operative position at the end of its rearward movement.

9. In an apparatus for separating by pressure, a plurality of blanks from sheet material, a pressure roll, upper and lower pressure plates adapted to receive sheet material between them, a plurality of shaped frames adapted to be removably positioned between said sheet material and one of said plates, a reciprocating support for passing the pressure plates with their interposed sheet material and frames forwardly under the pressure roll, and a swinging bracket on the reciprocating support for raising the upper plate out of its operative position at the end of its forward movement and lowering it into its operative position at the end of its rearward movement.

10. In an apparatus for separating by pressure a blank from sheet material, pressure means, pressure plates adapted to receive sheet material between them, a shaped frame adapted to be removably positioned between said sheet material and one of said plates, means for passing both pressure plates with the interposed sheet material and frame forwardly through the pressure means, and means for passing one of the plates rearwardly around the pressure means.

11. In an apparatus for separating by pressure a plurality of blanks from sheet material, pressure means, pressure plates adapted to receive sheet material between them, shaped frames adapted to be removably positioned between said sheet material and one of said plates, means for passing both pressure plates with the interposed sheet material and frames forwardly through the pressure means, and means for passing the upper plate rearwardly around the pressure means.

ARTHUR J. EVERS.